United States Patent [19]

Meegoda

[11] Patent Number: 5,340,396
[45] Date of Patent: Aug. 23, 1994

[54] PREPARATION OF ASPHALT CONCRETE WITH ORGANIC CONTAMINATED SOIL

[75] Inventor: Namunu J. Meegoda, Orange, N.J.

[73] Assignee: New Jersey Institute of Technology, Newark, N.J.

[21] Appl. No.: 961,438

[22] Filed: Oct. 15, 1992

[51] Int. Cl.⁵ ............................................. C04B 26/26
[52] U.S. Cl. ................................. 106/669; 106/671; 106/277; 106/281.1; 404/17; 404/79
[58] Field of Search ............... 106/669, 671, 281.1, 106/277; 404/17, 79

[56] References Cited

U.S. PATENT DOCUMENTS

| | | | |
|---|---|---|---|
| 4,025,057 | 5/1977 | Shearer | 259/154 |
| 4,153,471 | 5/1979 | Mendenhall | 106/281 R |
| 4,245,915 | 1/1981 | Bracegirdle | 366/12 |
| 4,898,472 | 2/1990 | Sasaki | 366/18 |
| 4,921,730 | 5/1990 | Sasaki | 106/281.1 |

Primary Examiner—Mark L. Bell
Assistant Examiner—Michael Marcheschi
Attorney, Agent, or Firm—Klauber & Jackson

[57] ABSTRACT

A method for the preparation of asphalt concrete from organic contaminated soils such as petroleum contaminated soils in batch mix processing, with reduced levels of pollution emissions. The resultant asphalt concrete is also either strengthened or the asphalt content can be reduced without loss of strength. The contaminated soil is added to superheated aggregate (380°-450° F.) in a closed mixer, in amounts ranging from 5-25% by weight of total aggregate, and the combination is mixed to uniformity, prior to addition of the asphalt cement binder. A conveying system for the cold wet contaminated soil is also described.

10 Claims, 2 Drawing Sheets

PREPARATION OF ASPHALT CONCRETE WITH ORGANIC CONTAMINATED SOIL

This invention relates to the batch production of asphalt concrete and particularly the batch production of asphalt concrete with petroleum or other organic contaminated soils.

In the past, organic materials such as coal tar, heating oil, gasoline, petroleum and petroleum products have contaminated soils, for example through spills, natural leaks, or leaks from broken or corroded storage tanks. In order to prevent such contaminated soil from further contaminating water supplies or causing other environmental concerns, it has been necessary to remove the contaminated soil and to dispose of it in an environmentally safe fashion. Few uses have however, arisen for the contaminated soil and its disposal has presented practical and environmental problems. In 1988, such petroleum contaminated soil began to be utilized as an aggregate component in the production of asphalt concrete.

One method of producing asphalt concrete, called the batch-mix process involves the wet mixing of aggregate components, generally crushed stone, gravel, soil, sand and the like. The wet mix is then dried in specially prepared driers and heated to about 300°–350° F. (149°–177° C.), the working temperature of asphalt. Asphalt binder, such as asphalt cement, is then mixed with the heated aggregate to produce the asphalt concrete. With the introduction of petroleum contaminated soil as part of the aggregate mix, in amounts ranging from about 5–10% by weight of the total aggregate, the batch mix process has frequently resulted in unacceptably high air emission pollution.

Drying and heating of the aggregate mix, including petroleum contaminated soil, to temperatures of 300°–350° F. (149°–177° C.) results in incineration of a portion of the petroleum contaminants. However, such incineration has only been 85–90% effective, with the residual vaporized petroleum products remaining as unacceptable air emissions.

It is accordingly an object of the present invention to provide a method for the production of asphalt concrete with organic (such as petroleum) contaminated soils with reduction of release of organic compounds to the air engendered by the contaminants.

It is a further object of the present invention to provide such method whereby the strength of the resulting asphalt concrete is enhanced; or maintained, with reduced asphalt cement contents.

It is a still further object of the present invention to provide a means for effecting a cold wet contaminated soil mixing in a batch mix asphalt plant.

These and other objects, features and advantages of the present invention will become more evident from the following discussion as well as the drawings in which:

Figure 1:
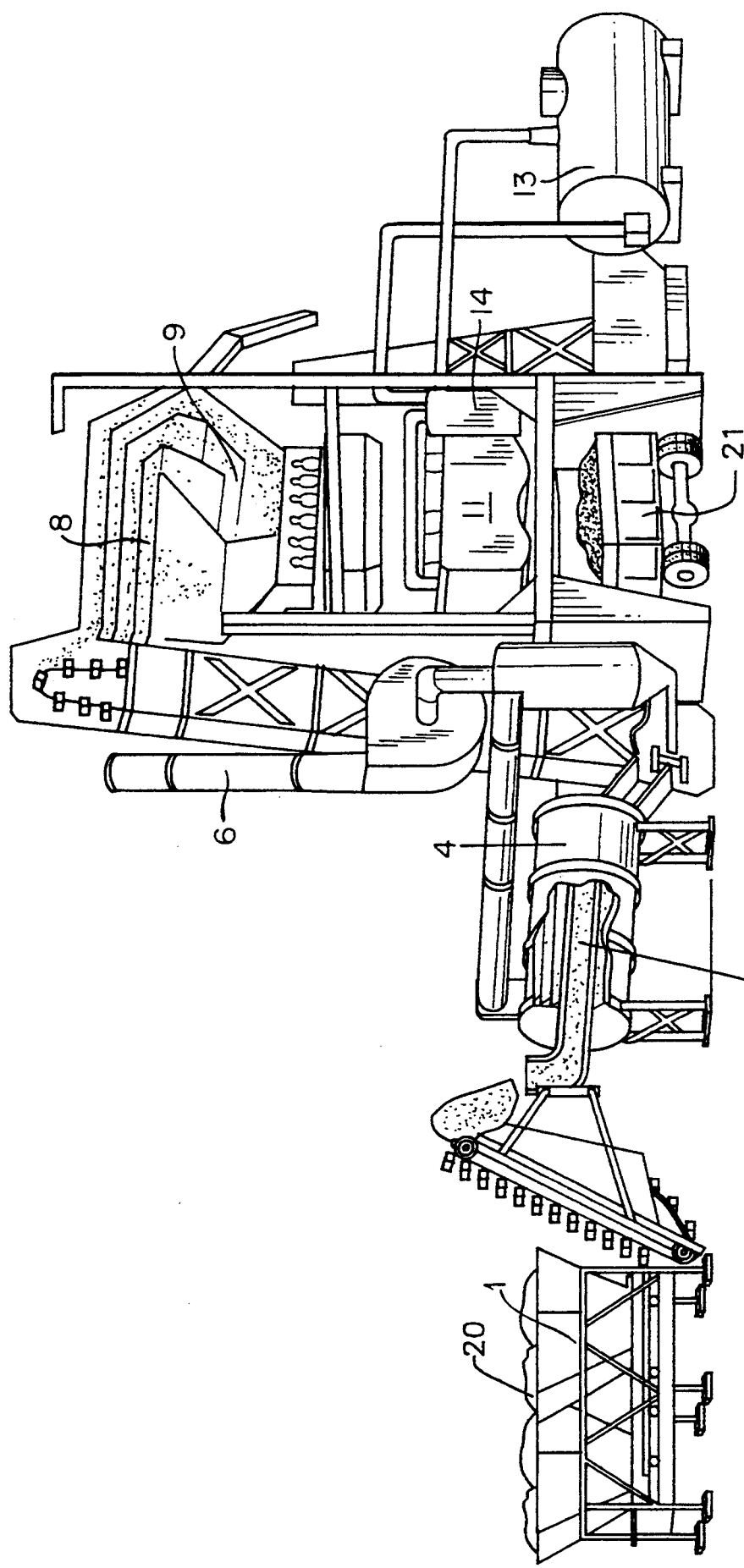
FIG. 1 is a representation of prior art asphalt production.

Generally, the present invention comprises a method for the batch mix processing of an asphalt aggregate, with organic contaminated soil, such as soil contaminated with coal tar, heating oil, gasoline, petroleum and petroleum products; into asphalt concrete with reduced levels of air emission contamination. In addition, the present invention comprises a method for production of asphalt concrete, with either enhanced strength and durability or maintenance of strength and durability with reduction of asphalt cement content. The present invention further comprises a device for conveying the contaminated soil into a mixer for the batch mix processing thereof, in the production of asphalt concrete.

The method of the present invention comprises the steps of adding the organic contaminated soil, in amounts of about 5 to 25% by weight of total asphalt aggregate, as a cold wet (non-heated aqueous mix) soil directly into the mixer which contains the remaining aggregate which has been super heated to temperatures in excess of 380° F. (193° C.) and preferably between 380° F. to 450° F. (193°–232° C.). The contact of the cold wet soil with the super heated aggregate results in the generation of steam which is believed to be the cause of the subsequent production of consistently stronger asphalt concrete with low asphalt cement contents and with no apparent reduction in durability. The level of contaminant in the soil varies with the absorptivity of the soil type and can be as much as 10–20% by weight.

Asphalt aggregate dryers require stacks for emission of moisture and combustion products. However, mixers in which the asphalt aggregates and binders are mixed, are closed to the atmosphere. The contaminated soil, in accordance with the present invention, is not placed into or heated by the drier. As a result of the separate addition of the cold wet contaminated soil to the heated non-contaminated aggregates in the closed mixer, escape of organic pollutants to the atmosphere is substantially precluded.

The asphalt materials are then mixed to substantial uniformity, with the temperature of the mixed contaminated soil and super heated aggregate equilibrating to at least between 300°–350° F. (149°–177° C.) and preferably to at least about 380° F. (193° C.), at which point the asphalt cement is added and mixed with the aggregate to form the asphalt concrete. The temperature of the non-contaminated aggregate is elevated above the normal working temperature of 300°–350° F. (149°–177° C.), in order to compensate for the cooling engendered by the addition of the cold wet contaminated soil.

Since the contaminated soil is directly added to the mixer it is preferred that such addition be effected by a drop conveyor system which carries the wet soil from a storage bin to and into the mixer. In such embodiment the contaminated soil is moved from a storage bin via drop feed conveyor means, comprising a first horizontal conveyor element and a second upwardly angled conveyor element with the lower angled end thereof being positioned beneath the first horizontal conveyor element. The contaminated soil is fed from the storage bin onto said first conveyor element; and then the contaminated soil drops from the first conveyor element onto the upwardly angled second conveyor element. The second conveyor element is positioned such that the contaminated soil drops from the upper end thereof into the mixer for mixing and subsequent heating with the super heated asphalt aggregate.

With specific reference to the drawings, in FIG. 1, a prior art standard batch mix asphalt concrete producing process is depicted. Stockpiled wet aggregates 20 are placed into dispensing bins 1. As required, the aggregates 20, including contaminated soil, are conveyed into dryer 4 for heating and drying. Stack 6 of dryer 4 exhausts moisture and combustion product gases including non-incinerated organic contaminants from the contaminated soil, into the atmosphere. The dried and heated aggregates 20 are then screened by screen 8 into dispensing containers 9. Thereafter, the aggregates 20 are measured for dispensing into mixer 11 together with a measured amount of asphalt cement binder 14 from tank 13. The heated aggregates and asphalt cement are mixed and the resultant asphalt concrete 50 is fed into site-vehicle conveyance 21 for use in paving.

Figure 2:
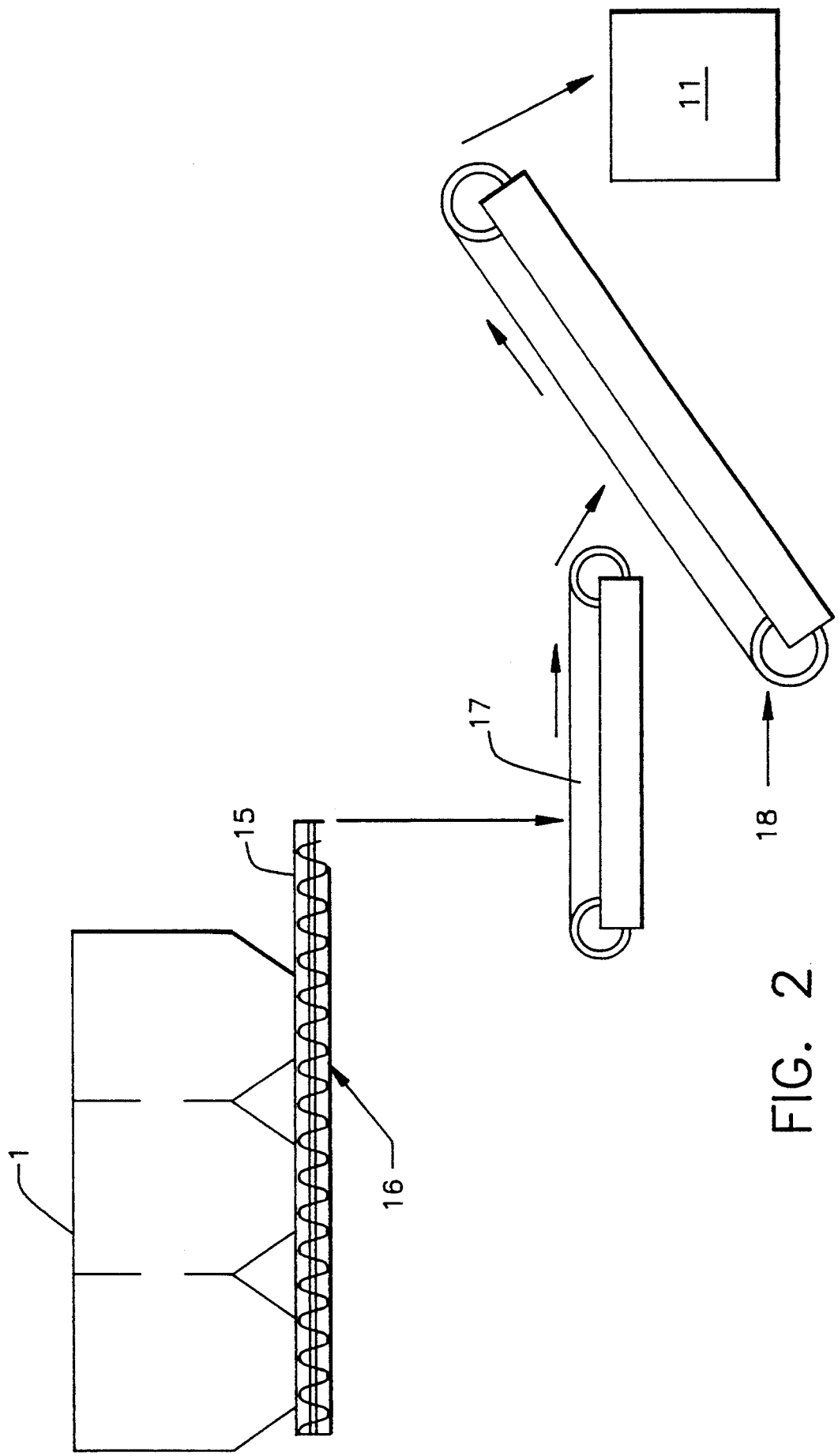
FIG. 2 is a representation of asphalt production according to the present invention with conveying means for the cold wet contaminated soil.

In accordance with the present invention, the aggregates 20, which are conveyed into the drier 4, do not include the contaminated soil. Instead, the contaminated soil 15 is fed from one of the bins 1 in which it is separately stored, as shown in FIG. 2, via collecting screw 16, by drop feed onto first horizontal conveyor 17, and then by drop feed onto second angled conveyor 18. The drop from the upper end of second conveyor 18 is directly into closed mixer 11. In accordance with the present invention, dryer 4 is modified to super heat the aggregates to temperatures of at least 380° F. (193° C.).

In comparisons with asphalt concretes prepared with contaminated soils in accordance with the method of the prior art, the asphalt concretes prepared in accordance with the present invention, consistently exhibit either improvement in strength without apparent loss of durability or permit reduction of asphalt cement contents with comparable strength.

In order to demonstrate the efficacy of the present invention, the following comparative examples are presented. The standard Marshall test method (ASTM D-1559-82) was utilized in testing all of the samples. Test specimens were all prepared and tests were performed for a New Jersey standard I-3 mix intended for the bottom layer of a surface course designed for heavy traffic and the most demanding paving use for asphalt concrete. Different soils with different contaminants and contamination levels were used in the tests as indicated. It is understood that the examples are illustrative in nature and that details contained therein are not to be construed as limitations on the present invention.

EXAMPLE 1 (PRIOR ART)

Aqueous wet mixes of six samples of organic contaminated soil of various types, contaminants and contaminant levels were processed in accordance with standard batch processing by being initially mixed with uncontaminated soil (the contaminated soil comprising 9% by weight of the mixture). The mixed soil was then placed in a flame type dryer until the temperature of the mix was about 325° F. (163° C.). The dried, heated soil was then placed in a mixer and mixed with 4.5 or 5% by weight of asphalt cement. The resultant asphalt concrete was compacted and subjected to the standard Marshall tests. Table 1 sets forth the parameters of the types of soils, contaminant levels, flow rate, percentage air voids, percentage of air voids and volume of mineral aggregates, density, optimum asphalt cement content, and Marshall test strength measurements. The table also includes the allowable parameters for the New Jersey I-3 mix.

TABLE 1

Optimum Properties of Asphalt Concrete with PCS for NJ I-3 Mix for Convectional Method

| Asphalt Concrete Property | Allowable for NJ I-3 Mix | Control ¾", ⅜", ¼" Aggregate in Sand & Stone Dust -No Contaminants | Well-Graded 0.12% Heating Oil Soil # | Clayey Silt 0.12% Heating Oil Soil #2 | Silty Sand 25 ppm Gasoline Soil #3 | Poorly Graded 25 ppm Gasoline Soil #4 | Silty Clay 1500 ppm Gasoline Soil #5 | Poorly Graded Sand with Silt 330 ppm Gasoline Soil #6 |
|---|---|---|---|---|---|---|---|---|
| Marshall Strength (lbf) | >1800 | 1800 | 1850 | 1900 | 2300 | 1900 | 1870 | 2350 |
| Flow (1/100") | >6.0 | 4.0 | 11.0 | 8.0 | 7.5 | 3.5 | 6.5 | 7.7 |
| Air Voids (%) | 2.0–8.0 | 7.0 | 7.5 | 3.0 | 5.7 | 8.0 | 4.0 | 3.4 |
| % of Air Voids and Volume of Mineral Aggregate | >13.0 | 18.0 | 17.8 | 14.0 | 16.8 | 18.0 | 14.7 | 14.2 |
| Density (pcf) | N/A | 152.0 | 155.0 | 153.0 | 150.5 | 146.0 | 153.6 | 152.8 |
| Optimum Asphalt Content (%) | 4–8 | 5.0 | 4.5 | 4.5 | 5.0 | 4.5 | 4.5 | 4.5 |

EXAMPLE 2

Cold wet samples of the six organic contaminated soils, as in Example 1, were added to a mixer containing uncontaminated soil which had been previously heated in a dryer to about 380° F. (193° C.). The cold contaminated soil and heated uncontaminated aggregates were allowed to reach a temperature equilibrium of about 350° F. (177° C.) Asphalt cement was then added and mixed, in amounts ranging from 3.75% to 4.5%. The resultant asphalt concrete was compacted and subjected to the Marshall test strength measurements, with the parameters and results, as in Example 1, being set forth in Table 2.

TABLE 2

Optimum Properties of Asphalt Concrete with PCS for NJ I-3 Mix for the Proposed Method

| Asphalt Concrete Property | Allowable for NJ I-3 Mix | Control ¾", ⅜", ¼" Aggregate in Sand & Stone Dust -No Contaminants | Well-Graded 0.12% Heating Oil Soil #1 | Clayey Silt 0.12% Heating Oil Soil #2 | Silty Sand 25 ppm Gasoline Soil #3 | Poorly Graded 25 ppm Gasoline Soil #4 | Silty Clay 1500 ppm Gasoline Soil #5 | Poorly Graded Sand with Silt 330 ppm Gasoline Soil #6 |
|---|---|---|---|---|---|---|---|---|
| Marshall Strength (lbf) | >1800 | 1800 | 1870 | 1900 | 2300 | 1850 | 2300 | 2600 |
| Flow (1/100") | >6.0 | 4.0 | 6.0 | 6.2 | 3.9 | 6.0 | 7.0 | 7.0 |
| Air Voids (%) | 2.0–8.0 | 7.0 | 8.0 | 4.0 | 7.0 | 7.0 | 6.0 | 2.0 |
| % of Air Voids and Volume of Mineral Aggregate | >13.0 | 18.0 | 18.2 | 13.1 | 16.7 | 16.2 | 13.0 | 13.0 |
| Density (pcf) | N/A | 152.0 | 151.5 | 153.4 | 152.0 | 152.5 | 156.1 | 156.6 |
| Optimum Asphalt Content (%) | 4–8 | 5.0 | 3.75 | 4.0 | 4.0 | 3.75 | 4.0 | 4.5 |

EXAMPLE 3

Two test samples, each consisting of ¾" size, ⅜" size and ¼" size aggregates, sand, and stone dust, but without organic contaminants, were processed and tested according to the processes and testing of Examples 1 and 2 respectively, as controls. Results and parameters are set forth in Tables 1 and 2, respectively.

It is evident from the above examples and tables that the presence of organic contaminants is beneficial to the production of asphalt concrete. In addition, the process of the present invention of bypassing the drying and heating step for the contaminated portion of the soil of the aggregate substantially reduces emission of organic pollutants. The direct addition of the cold wet contaminated soil to dried and heated uncontaminated aggregate, in the mixing step, also uniformly, significantly strengthens the resultant asphalt concrete (independent of soil type) and/or permits the utilization of lower amounts of asphalt cement without degradation of strength. Additional environmental cycling tests of wet/dry cycles and freeze/thaw cycles exhibited little variation in strength degradation between the asphalt concretes prepared according to the prior art method and the method of the present invention.

It is understood that the above description, drawings, and examples are illustrative of the present invention and that changes may be made to relative materials and processes of preparation without departing from the scope of the present invention as defined in the following claims.

What is claimed is:

1. A method for the batch mix processing of an asphalt aggregate, containing organic contaminated soil, into asphalt concrete, comprising the steps of:
   a) heating non-contaminated asphalt aggregate to a temperature of at least about 380° F. (193° C.);
   b) placing the heated asphalt aggregate into a mixer;
   c) adding organic contaminated soil, in amounts about 5 to 25% by weight of total asphalt aggregate, as a cold wet non-heated aqueous mix directly into the mixer and into contact with the heated non-contaminated asphalt aggregate;
   d) mixing the heated asphalt aggregate and contaminated soil for a time sufficient to reach an equilibrium temperature of at least 300° F. (149° C.); and
   e) adding and mixing a binder to the mixture of asphalt aggregate and contaminated soil, to form the asphalt concrete.

2. The method of claim 1 wherein the non-contaminated asphalt aggregate is heated to a temperature between 380° F. and 450° F. (193°–232° C.).

3. The method of claim 2 wherein the non-contaminated asphalt aggregate and contaminated soil equilibrate to a temperature of at least about 300° F. (149° C.).

4. The method of claim 1 wherein the organic contaminant is selected from the group consisting of coal tar, heating oil, gasoline, petroleum and petroleum products.

5. The method of claim 1 wherein the mixer is closed to the atmosphere.

6. The method of claim 1 wherein said organic contaminated soil is added to said mixer by conveying the contaminated soil from a storage bin via drop feed conveyor means, comprising a first horizontal conveyor element and a second upwardly angled conveyor element with the lower angled end thereof being positioned beneath the first horizontal conveyor element; whereby the petroleum contaminated soil is fed from said storage bin onto said first conveyor element; and whereby the contaminated soil drops from said first conveyor element onto said upwardly angled second conveyor element; and whereby said second conveyor elements is positioned such that the contaminated soil drops from the upper end of said second conveyor element into said mixer.

7. An asphalt concrete made in accordance with the method of claim 1.

8. An asphalt concrete made in accordance with the method of claim 2.

9. An asphalt concrete made in accordance with the method of claim 3.

10. An asphalt concrete made in accordance with the method of claim 4.

* * * * *